(12) United States Patent  (10) Patent No.: US 8,766,479 B2
Dorn et al.  (45) Date of Patent: Jul. 1, 2014

(54) SYSTEM AND METHOD FOR PARALLELING ELECTRICAL POWER GENERATORS

(75) Inventors: Douglas W. Dorn, Sheboygan Falls, WI (US); Isaac S. Frampton, Waldo, WI (US)

(73) Assignee: Kohler Co., Kohler, WI (US)

( * ) Notice: Subject to any disclaimer, the term of this patent is extended or adjusted under 35 U.S.C. 154(b) by 745 days.

(21) Appl. No.: 12/873,608

(22) Filed: Sep. 1, 2010

(65) Prior Publication Data

US 2012/0049638 A1 Mar. 1, 2012

(51) Int. Cl.
*H02J 1/00* (2006.01)

(52) U.S. Cl.
USPC .......... 307/82; 307/29; 307/70; 307/84; 307/65; 290/31; 322/22; 322/23

(58) Field of Classification Search
CPC ............. H02J 1/102; H02J 3/36; H02J 1/10
USPC .......... 307/70, 84, 85, 80, 64, 76, 87, 81, 19, 307/153, 66; 290/31
See application file for complete search history.

(56) References Cited

U.S. PATENT DOCUMENTS

| | | | |
|---|---|---|---|
| 3,185,857 A | 5/1965 | Johnson | |
| 4,136,286 A | 1/1979 | O'Halloran et al. | |
| 4,879,624 A | 11/1989 | Jones et al. | |
| 5,168,208 A | 12/1992 | Schultz et al. | |
| 5,182,464 A | 1/1993 | Woodworth et al. | |
| 5,390,068 A | 2/1995 | Schultz et al. | |
| 5,729,059 A | 3/1998 | Kilroy et al. | |
| 5,734,255 A | 3/1998 | Thompson et al. | |
| 5,754,033 A | 5/1998 | Thomson | |
| 5,949,153 A * | 9/1999 | Tison et al. | 307/29 |
| 6,104,171 A | 8/2000 | Dvorsky et al. | |
| 6,555,929 B1 | 4/2003 | Eaton et al. | |
| 6,631,310 B1 | 10/2003 | Leslie | |
| 6,639,331 B2 * | 10/2003 | Schultz | 307/84 |
| 6,653,821 B2 | 11/2003 | Kern et al. | |
| 6,657,416 B2 | 12/2003 | Kern et al. | |
| 6,668,629 B1 | 12/2003 | Leslie | |
| 6,847,297 B2 | 1/2005 | Lavoie et al. | |
| 6,892,115 B2 | 5/2005 | Berkean et al. | |

(Continued)

OTHER PUBLICATIONS

PCT/US2011/049949 International Search Report dated Dec. 22, 2011 (3 pages).

(Continued)

*Primary Examiner* — Rexford Barnie
*Assistant Examiner* — Jagdeep Dhillon
(74) *Attorney, Agent, or Firm* — Michael Best & Friedrich LLP

(57) ABSTRACT

A plurality of generators can be connected in parallel to a common electrical bus. Each generator has a controller that regulates the voltage and frequency of the electricity being produced. Before a given generator connects to the electrical bus, its controller senses whether electricity is present on the bus and if not, the connection is made. Otherwise, the controller synchronizes the electricity being produced to the electricity is present on the bus before the connection occurs. The controller in each generator may also implement a load sharing function which ensures that the plurality of generators equitably share in providing the total amount of power demanded by the loads. The load sharing can be accomplished by controlling the generators to operate a substantially identical percentages of their individual maximum power generation capacity.

19 Claims, 3 Drawing Sheets

(56) References Cited

U.S. PATENT DOCUMENTS

| | | |
|---|---|---|
| 6,909,942 B2 | 6/2005 | Andarawis et al. |
| 6,914,763 B2 | 7/2005 | Reedy |
| 6,985,784 B2 | 1/2006 | Vandevanter et al. |
| 6,999,291 B2 | 2/2006 | Andarawis et al. |
| 7,019,495 B2 | 3/2006 | Patterson |
| 7,043,340 B2 | 5/2006 | Papallo et al. |
| 7,301,738 B2 | 11/2007 | Pearlman et al. |
| 7,557,544 B2 | 7/2009 | Heinz et al. |
| 7,656,060 B2 * | 2/2010 | Algrain .......................... 307/84 |
| 7,816,813 B2 * | 10/2010 | Yagudayev et al. ............. 307/64 |
| 8,106,633 B2 * | 1/2012 | Dozier et al. ................... 322/22 |
| 2010/0007207 A1 | 1/2010 | Peuser |

OTHER PUBLICATIONS

PCT/US2011/049949 International Written Opinion dated Dec. 22, 2011 (9 pages).

* cited by examiner

SYSTEM AND METHOD FOR PARALLELING ELECTRICAL POWER GENERATORS

CROSS-REFERENCE TO RELATED APPLICATIONS

Not Applicable

Statement Regarding Federally Sponsored Research or Development

Not Applicable

BACKGROUND OF THE INVENTION

1. Field of the Invention

The present invention relates to systems that use a plurality of electric power generators working together; and more particularly, to systems which operate multiple electric power generators in parallel to provide the power in a more efficient and flexible manner.

2. Description of the Related Art

Standby generators provide electrical power when power is unavailable from an electric utility company (e.g. during weather disturbances) or to provide power at a remote location where utility company power is not available. One type of standby electric generator comprises an internal combustion engine driving an electrical alternator that produces alternating electricity. Other types of standby electric generators include photovoltaic arrays and wind turbine generators.

For electrical systems that require large amounts of power, there can be advantages to employing multiple small generators, rather than a single large generator. In this regard, if one generator fails or requires maintenance, a multi-generator system can still supply some power, whereas a single generator system will not. Further, in a multi-generator system load growth can be accommodated by adding another generator, rather than bearing the cost of replacing a single very large generator with an even larger one.

Furthermore, large generators present difficulties in shipping and installation complexity. Thus by using several smaller generators one can distribute the overall generator weight over a broader area, avoiding the need for special strengthening of the supporting area (e.g. of a roof). Moreover, some smaller generators require less frequent maintenance. A variety of generator systems with multiple generator sets have been described previously as in U.S. Pat. Nos. 4,136,286, 6,653,821 and 7,656,060.

Nevertheless, when using multiple generators with outputs connected in parallel, there is a need to synchronize the alternating electricity that each device produces. This involves matching phase angles of the alternating output voltage and current from each generator. In addition, the magnitude of the voltage produced by each generator must be identical. Traditional generator paralleling techniques have been quite complex, often requiring several additional pieces of equipment to achieve the needed functions. This may include separate synchronizers, load managers, and/or switch gear. Moreover, prior art paralleling systems can require significant time to synchronize the operation of the multiple generators once a power need is appreciated.

In addition, traditional systems are not well suited to mix the power from different types of energy sources (e.g. single-phase generators with three-phase generators), or to address mechanical and electrical load differences, or to address differences in optimal generator usage based on noise, fuel and other requirements at particular times during the day.

One company has noted that conventional two-generator paralleling systems often have as many as fourteen controllers to manage speed, load sharing, synchronization, voltage regulation, the internal combustion engine, and load protection. They then proposed to reduce the number of controllers by creating an integrated digital control, an integrated paralleling switch, and an integrated master control that are linked by a communication bus to the individual generators. This system, however, still requires additional control equipment beyond the controllers in each generator, adding cost and complexity to the overall system.

Hence, there is a need for improvements in the design of systems for paralleling and operating multi-generator systems.

SUMMARY OF THE INVENTION

An electrical distribution system that has a parallel electrical bus through which power produced by a plurality of energy sources is supplied to electrical loads. The energy sources includes a generator arrangement comprising an alternator, a circuit breaker, an output sensor, a bus sensor, and genset controller. The alternator produces alternating electricity and the circuit breaker selectively connects and disconnects the alternator to and from the parallel electrical bus. The output sensor senses a characteristic of the alternating electricity, such as voltage or current, and the bus sensor sensing that characteristic of electricity in the parallel electrical bus.

The genset controller is connected to the output sensor, the bus sensor and the circuit breaker, and controls the excitation and speed of the alternator. Prior to applying the alternating electricity to the parallel electrical bus, the genset controller:

a) determines whether electricity is present on the parallel electrical bus;

b) if electricity is not present on the parallel electrical bus, the genset controller operates the circuit breaker to apply the alternating electricity produced by the alternator to the parallel electrical bus;

c) if electricity is present on the parallel electrical bus, then the genset controller:

1) varies operation of the alternator to synchronize the alternating electricity produced by the alternator to the electricity present on the parallel electrical bus; and thereafter 2) operates the circuit breaker to apply the alternating electricity produced by the alternator to the parallel electrical bus.

In another aspect of the electrical distribution system enables a single-phase generator to supply power to the parallel electrical bus at certain times when the aggregate load is relatively small, and enables a three-phase generator to supply power to the parallel electrical bus at other times.

It should be appreciated that this system avoids the need for many equipment parts previously required to achieve the paralleling of multiple energy sources on the same electrical bus. It further provides flexibility as to the types of power and loads that the system can accommodate.

Alternative energy sources such as wind turbines, solar generators, heat pumps, and the like can also be readily incorporated.

Optionally, each energy source can implement independently a load sharing function. This enables the power produced by an energy to be adjusted so that the total power demanded by all the loads is equitably divided among the different energy sources.

The foregoing and other advantages of the present invention will be apparent from the following description. In that description reference is made to the accompanying drawings which form a part thereof, and in which there is shown by way of illustration, and not limitation, preferred embodiments of the invention. Such embodiments do not necessarily represent the full scope of the invention, and reference should therefore be made to the claims herein for interpreting the scope of the invention.

DETAILED DESCRIPTION OF THE INVENTION

Figure 1:
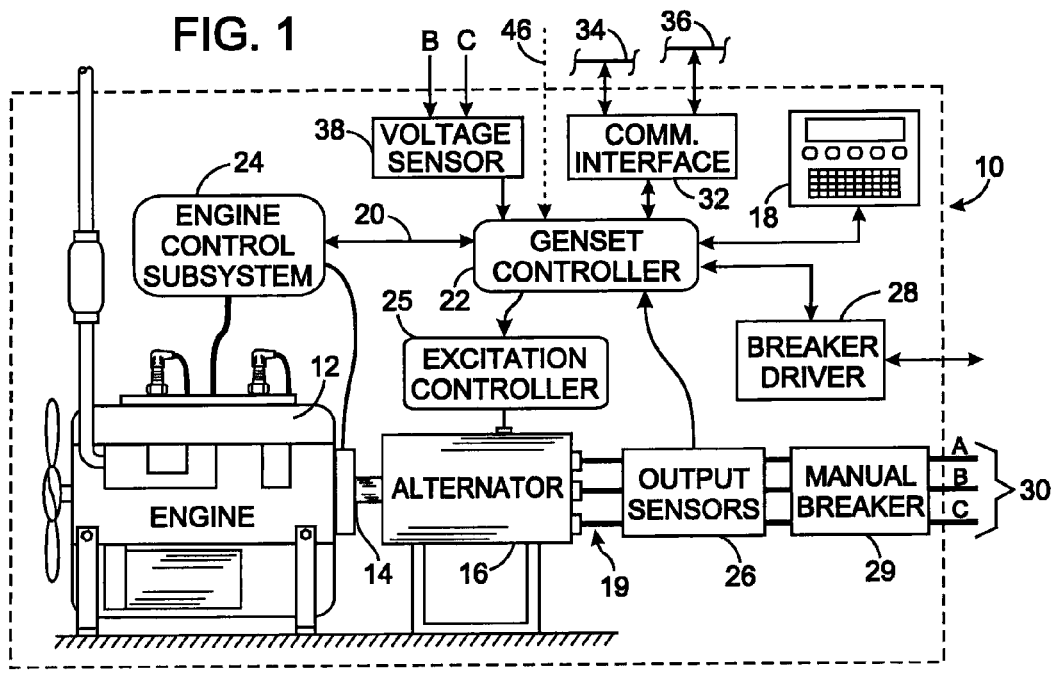
FIG. 1 is a diagram showing an exemplary generator that has an alternator which incorporates the present invention.

With initial reference to FIG. 1, a generator 10, sometimes called an engine generator set or simply a genset, comprises an prime mover, such as an internal combustion engine 12, coupled by a shaft 14 to an electrical alternator 16. In one application, the generator 10 provides back-up electrical power to a building in the event that power from an electric utility company is interrupted. Such interruption is detected by an external device that sends a signal to a genset controller 22 which responds by sending a start command via a communication bus 20 to an engine control subsystem 24. The communication bus 20 may conform to the Computer Area Network (CAN) J-1939 standard promulgated by SAE International, however, other communication bus protocols may be used. The genset controller 22 and the engine control subsystem 24 respectively control operation of the alternator 16 and the internal combustion engine 12.

In another application, the generator 10 produces electrical power on a yacht. There the internal combustion engine 12 may also provide propulsion power for the yacht, in which case the alternator 16 is connected to the internal combustion engine through a transmission that enables the speed of the alternator to be varied independently of the speed of the internal combustion engine 12. A standby generator may be provided to supply electrical power when the yacht is moored and operation of the main engine is not required for propulsion. When the yacht is at a dock, electrical power can be received from a connection to utility company lines on shore.

The genset controller 22 is a microcomputer based subsystem that executes a control program which governs the operation of the alternator 16. An example of such a genset controller is described in U.S. Pat. No. 6,555,929, which description is incorporated by reference herein. The genset controller 22 receives signals from an operator control panel 18 and output sensors 26 that sense the voltage and the current levels of the electricity produced by the alternator 16. The genset controller 22 regulates the output voltage by determining whether and by how much the sensed voltage level deviates from the nominal voltage level (e.g., 240 volts) that is desired. Any deviation causes the excitation controller 25 to employ a conventional voltage regulation technique that controls the engine speed and the excitation voltage applied to a field winding in the alternator 16. By selectively controlling the intensity of the magnetic field emitted from the field winding, the output voltage produced by the alternator 16 is regulated to a substantially constant level in a known manner.

The three-phase output 19 of the alternator 16 is fed through the output sensors 26 to three output lines 30 of the generator 10. The genset controller 22 receives signals from the output sensors 26 indicating parameters of the alternator's electrical output, such as voltage and current levels, and from those signals derives the frequency and the polarity angle of the alternating voltage produced by the alternator. A bus sensor, in the form of a voltage sensor 38, is connected to one phase of the electrical distribution system so that the genset controller 22 can determine the magnitude, frequency, and polarity angle of the alternating voltage on the parallel electrical bus 42. A breaker driver 28 is provided to operate external motorized circuit breakers to open and close a set of contacts that connect the output lines 30 to an electrical distribution system, as will be described. The breaker driver 28 responds to a control signal from the genset controller 22 and conveys a status signal back to the genset controller 22 indicating the conductive state of the contacts, i.e., open or closed. An optional normally-closed, manual circuit breaker 29 may be included for manually disconnecting the alternator output 19 from three output lines 30.

The genset controller 22 is coupled via a communication interface 32 to first and second communication links 34 and 36, over which data, commands and other messages are exchanged with external devices. This communication employs a conventional protocol, such as RS485, CAN, or Ethernet. Hardwired or wireless communication links can be used. The first communication link 34 handles messages related to synchronizing a plurality of energy sources that are connected in parallel to the same electrical distribution system. The second communication link 36 interfaces the generator 10 to other external devices, such as monitoring equipment and a controller that manages electrical loads in a building.

Figure 2:
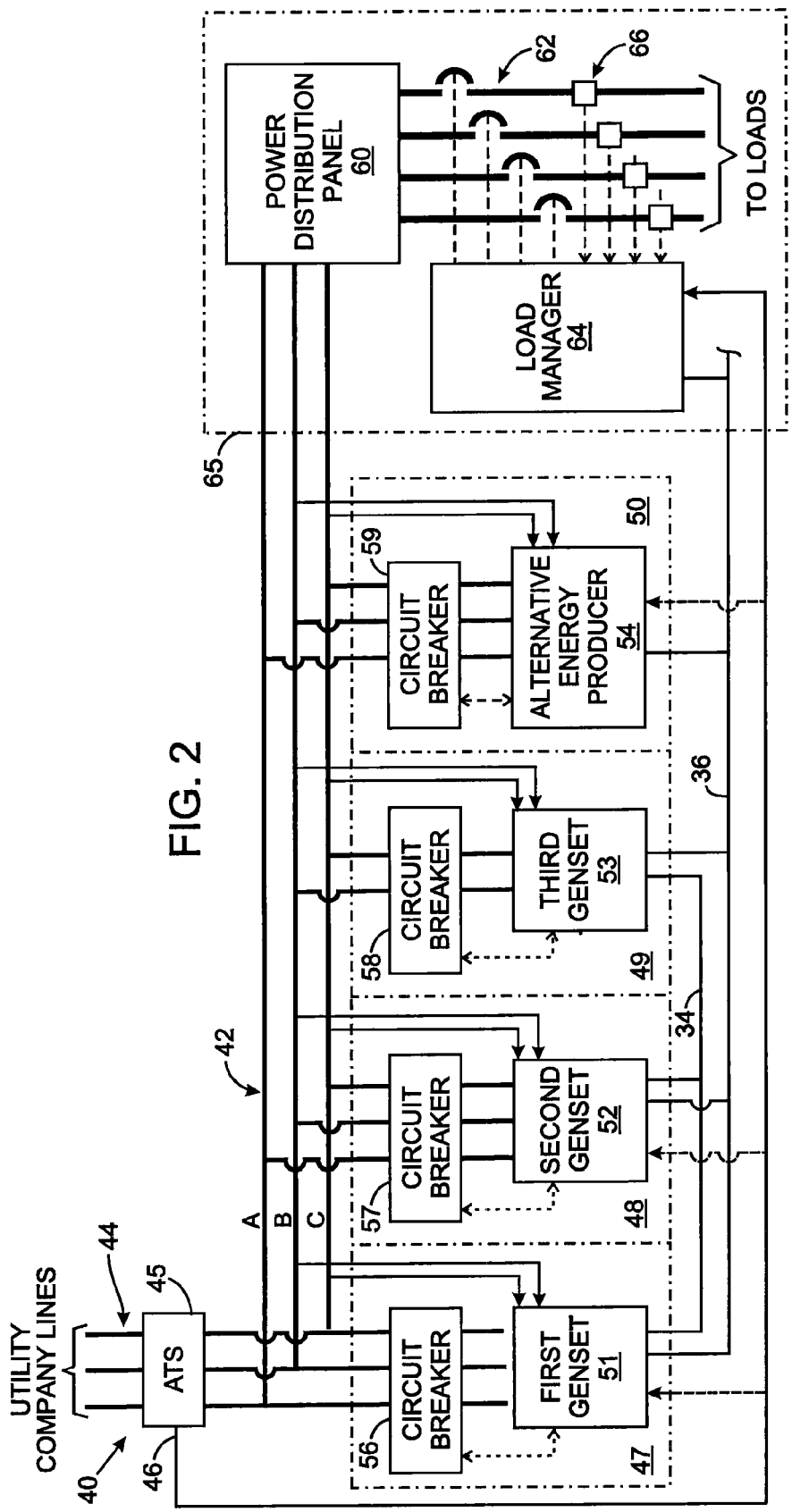
FIG. 2 is a block schematic diagram of an exemplary electrical system that has a plurality of energy sources.

Several of the generators 10 can be connected in parallel as energy sources in an electrical distribution system. As used herein, an "energy source" generically refers to an apparatus that produces single-phase or three-phase electricity. With reference to FIG. 2, an exemplary electrical distribution system 40 comprises a three-phase parallel electrical bus 42 that has separate conductors A, B and C. The parallel electrical bus 42 is coupled to utility company lines 44 by an automatic transfer switch (ATS) 45. This automatic transfer switch 45 is similar to conventional devices that detect when electricity from the utility lines 44 is interrupted, such as when power lines are knocked down during a storm. When the utility line electricity is interrupted, the automatic transfer switch 45 sends a signal indicating that event via control line 46, and then opens contacts which disconnect the utility lines 44 from the parallel electrical bus 42. Whereas, some automatic transfer switches, upon disconnecting the utility lines, also connect a standby energy source to the parallel electrical bus, that connection does not occur in the present distribution system 40. Instead, separate circuit breakers 56-59 are employed to individually connect each standby energy source 47-50 to the parallel electrical bus 42, as will be described.

Specifically, the exemplary electrical distribution system 40 has a plurality of energy sources 47, 48, and 49 comprising first, second and third generators (gensets) 51, 52, and 53 individually connected to the parallel electrical bus 42 by motorized circuit breakers 56, 57, and 58, respectively. Another energy source s 50 includes an alternative energy producer 50, such as a photovoltaic array, a wind turbine generator, a geothermal driven electrical generator, a heat pump, or a similar device, also is connected to the parallel electrical bus 42 by another motorized circuit breaker 59. A lesser or greater number of energy sources than are illustrated can be provided. The present technique for paralleling multiple energy sources enables both three-phase and single-phase energy sources to be connected to the three-phase parallel electrical bus 42. In this regard, note that the first and second generators 51 and 52 are three-phase devices, whereas the third generator 53 is a single-phase device which is only connected to phase lines B and C of the parallel electrical bus 42. Normally the single-phase third generator 53 is actively connected to the parallel electrical bus when the three-phase energy sources are inactive.

The parallel electrical bus 42 is connected through a distribution panel 60 to various loads within a structure 65, such as a building or a vehicle. In some installations, the loads are coupled to the power distribution panel by individual contactors 62, which can be electrically operated to disconnect specific loads from the power distribution panel 60 and thus from the parallel electrical bus 42. Those contactors 62 are operated by a computerized controller, commonly referred to as a load manager 64, in the structure. The load manager 64 also is connected to a plurality of load sensors 66 that measure the magnitudes of power consumed by the various electrical loads. Such load managers are conventional devices that monitor the magnitude of all the electrical loads being powered and compare the aggregate power requirements of those loads to the total amount of electrical power available from the parallel electrical bus 42. Under specific conditions or at predefined times of the day, the load manager 64 opens one or more of the contactors 62 to disconnect the associated load from the parallel electrical bus 42. This operation is often referred to as "load shedding." For example, during an extremely hot day, the electric utility company may request that customers shed or disconnect non-essential loads from the electrical utility lines because of the high demand for electricity resulting from increased operation of air conditioning systems. In addition, as will be further described, when electricity from the utility company lines 44 is unavailable, the backup power supplied by the various energy sources 47-49 can be allocated to only high priority or essential loads by the load manager 64 within building 65 operating the contactors 62 to disconnect low priority or non-essential loads. For example, during such an interrupted power condition, backup power in a hospital will be allocated first to life support systems and other critical loads, whereas non-essential loads, such as most building lights, can be disconnected. Such a load manager is commonplace in buildings.

Industrial Applicability

The electrical distribution system 40 utilizes an improved and unique process for activating and managing multiple energy sources and synchronizing the outputs of those sources so that the electricity they produce can be combined on the same parallel electrical bus. Assume that the electricity from the utility lines 44 is interrupted and that the energy sources 47-49 need to be activated to supply power to the loads. At such time, the automatic transfer switch 45, upon disconnecting the utility company lines 44, sends an interruption message over control line 46 to the load manager 64 in the building 65. The load manager 64 responds in a conventional manner by operating selected contactors 62 to disconnect non-essential loads from the parallel electrical bus 42. Subsequently, should the energy sources 47-49 apply a sufficient the amount of current to the parallel electrical bus 42 to power all the loads, any previously opened contactor 62 can be closed so that both essential and non-essential loads are powered during the utility line interruption. The load manager knows the maximum power generation capacity of all the energy sources 47-49 and senses the power demands of each load circuit extending from the power distribution panel 60.

The load manager 64 further responds to the interruption message from the automatic transfer switch 45 by sending start commands via the second communication link 36 to the first and second energy sources 47 and 48. Note that the third energy source 49 has a single-phase generator 53 and is only started in special situations, as will be described. Alternatively, if the electrical distribution system 40 does not have a load manager 64, the interruption message on control line 46 from the automatic transfer switch 45 can be communicated directly to each of the first and second energy sources 47 and 48 and functions as the start command. In that latter case, the interruption message is applied directly to an input of the genset controller 22 within each of the generators 51-53, as shown in FIG. 1. In either case, first and second energy sources 47 and 48 respond to that start command by commencing the production of electricity.

Figure 3:
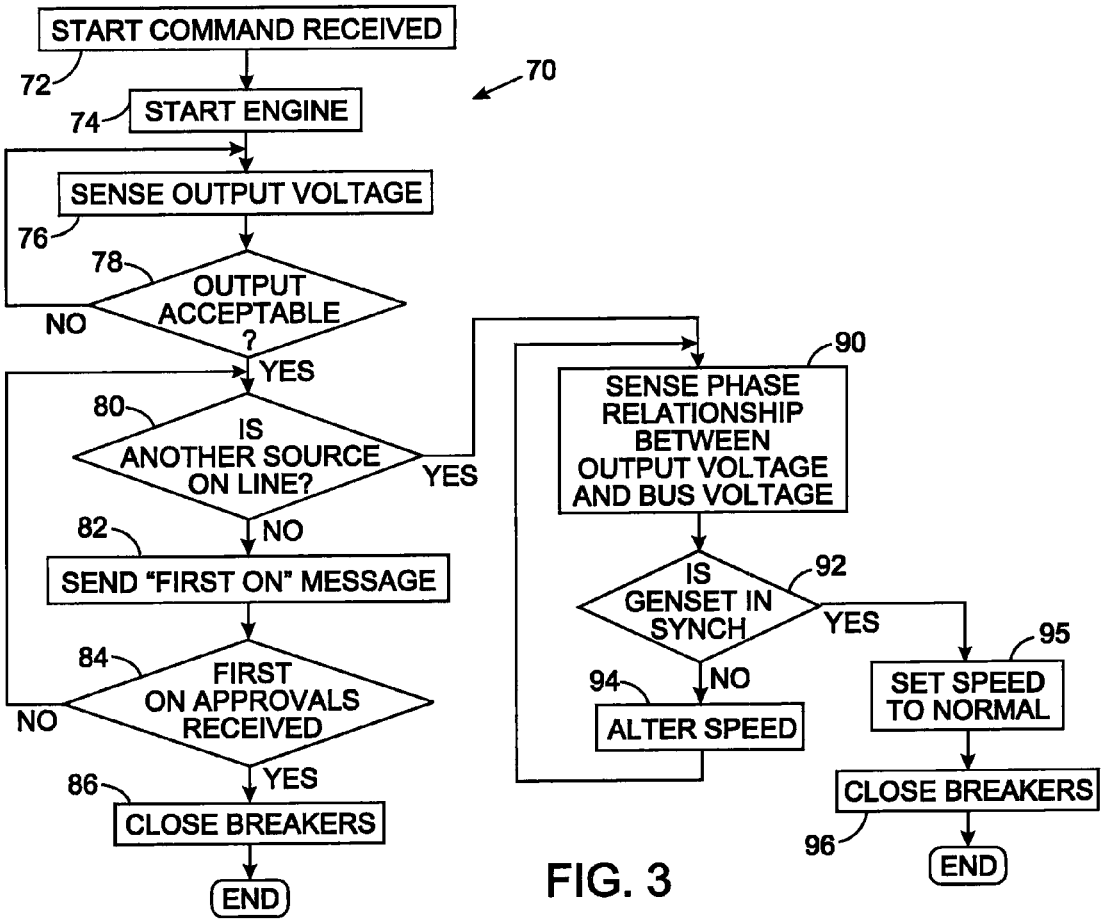
FIG. 3 is a flowchart of a synchronization process performed by each energy source upon starting.

With reference to FIG. 3, the computer in each the genset controller 22 or in another type of energy source, independently executes a software synchronization routine 70 which ensures that the alternating electricity from all the energy sources is phase synchronized. This software routine is in addition to the conventional program that the genset controller 22 executes to govern the operation of the generator 10.

The synchronization routine 70 commences at step 72 upon the receipt of the start command. In response, the genset controller 22 sends an activation signal via bus 20 to the engine control subsystem 24 instructing that the engine 12 be started at step 74. Then, the genset controller begins monitoring the magnitude and frequency of the output voltage produced by alternator 16. Specifically, at step 76, the genset controller 22 inspects the signals received from the output sensors 26 to ascertain those electrical parameters. A determination is made at step 78 whether the output voltage has a magnitude and a frequency that are acceptable for applying the electricity from the alternator 16 to the parallel electrical bus 42. For example, the frequency of the alternating output voltage should be at or within an acceptable range of the nominal frequency (50 or 60 Hz) for the alternating electricity. The magnitude of the output voltage also should be within a predefined tolerance of the nominal voltage level (e.g., 240 volts). If the output of the alternator 16 has not yet reached the acceptable levels, the execution of the synchronization routine 70 returns to step 76. The control process loops through steps 76 and 78 until the alternator output is found to have reached an acceptable level.

Once the alternator output is acceptable, the synchronization routine 70 advances to step 80 at which a determination is made whether another energy source is already connected to the parallel electrical bus 42. That determination is made by the genset controller 22 inspecting the input from the voltage sensor 38 which indicates whether an electrical voltage is present on the parallel electrical bus 42. The voltage sensor 38 only detects the phase voltage between conductors B and C of the parallel electrical bus 42, although all three-phase voltages could be sensed. Alternatively, a current sensor may be to detect electricity on the bus in place of the voltage sensor 38.

Assume that the first generator 51 reaches an acceptable operating level before the second generator 52, thus electricity is not present on the parallel electrical bus (the bus id "dead"). Now the synchronization routine 70 executed by the first generator 51 advances to step 82 at which a "first on" message is broadcast over the first communication link 34 indicating that this energy source 47 is now in a proper operating state and wants to be first one to connect to the parallel electrical bus 42. That message is received by the other energy sources which reply with an acknowledge message stating that they are not yet at an acceptable operating level and granting permission for the first generator 51 to apply its electrical output to the parallel electrical bus 42. If at step 84, acknowledgements are not received from all of the other energy sources, execution of the synchronization routine 70 returns to step 80 to determine whether another source now is applying electricity to the parallel electrical bus 42. This looping continues until either electricity is found on that bus or acknowledgement messages are received from all the other energy sources. If necessary, a standard conflict resolution technique is employed to enable one of the energy sources to be the first one to connect to the parallel electrical bus 42.

When all the acknowledgement messages are received, the synchronization routine 70 advances to step 86 at which the genset controller 22 in the first generator (genset) 51 sends a command to the breaker driver 28 which in turn activates the associated motorized circuit breaker 56. This causes that circuit breaker 56 to connect the output lines 30 of the first generator 51 to the parallel electrical bus 42. Thereafter, execution of the synchronization routine in the first generator terminates.

At this time, the second generator 52 continues to execute its synchronization routine 70. The electricity produced by the other energy sources cannot be applied to the parallel electrical bus 42 unless that electricity is in phase synchronization with the electricity already present on that bus. To that end, synchronization routine execution by each other energy source, e.g. second generator 52, now discovers the electricity from the first generator 51 on the parallel electrical bus 42 at step 80 and branches to step 90. At this juncture in FIG. 3, the phase relationship between the output voltage produced by the respective alternator 16 and the voltage on the parallel electrical bus 42 is determined by the genset controller 22. The BC output voltage level, detected by the output sensors 26, is inspected to determine the output voltage polarity angle. At the same time, polarity angle detection of the BC voltage on the parallel electrical bus 42 is performed using the output from the voltage sensor 38. The difference between those voltage polarity angles indicates whether the alternating electricity produced by the energy source is synchronized with the alternating electricity on the parallel electrical bus. Alternatively the polarity angles of the alternating currents at the alternator output and in the parallel electrical bus 42 can be used to determine when the output of the respective alternator 16 is synchronized to the parallel electrical bus 42.

At step 92, the difference between those voltage polarity angles is inspected to determine whether the alternator output is in synchronization with the electricity on the parallel electrical bus 42. That synchronization is considered as occurring when the voltage polarity angle difference is zero or at least less than a predefined small tolerable amount. If the output of the second generator 52 is not in synchronism, the software synchronization routine 70 advances to step 94 where the genset controller 22 issues a command to the engine control subsystem 24 to change the speed of the engine 12 to alter the frequency of the output of the alternator 16. The genset controller 22 uses the magnitude of the voltage polarity angle difference and whether its generator's output is leading or lagging the alternating bus voltage to determine whether the engine speed should be increased or decreased and by how much. The engine control subsystem 24 varies the speed of the engine 12 in a conventional manner, such as by controlling the engine throttle to varies the supply of fuel. After issuing the engine speed command, the synchronization routine 70 returns to step 90 to repeat sensing the two voltages and determining whether they are or are not in synchronism.

Eventually at step 92, the output of the second generator 52 is found to be synchronized with the voltage present on the parallel electrical bus 42, at which time the process branches to step 95. Here, a speed command is sent by the genset controller 22 to the engine control subsystem 24 indicating that the engine 12 should be operated at the nominal speed for generating the appropriate electrical frequency (i.e., 50 or 60 Hz). Then at step 96, the genset controller sends an activation signal to the breaker driver 28 which responds by closing the associated circuit breaker 57, thereby connecting the output lines 30 of the second generator 52 to the parallel electrical bus 42. Execution of the synchronization routine 70 by the second generator 52 then terminates at step 98.

In this manner, once one of the energy sources connects to the parallel electrical bus 42, each of the other energy sources synchronizes its output voltage waveform to the alternating bus voltage. In this matter, the synchronization routine 70 executed in each of the energy sources 47-49 ensures that its respective electrical output is synchronized and compatible with the electricity already present on the parallel electrical bus. Thus, the synchronization is performed independently by each of those other energy sources which eliminates the need for external devices to perform the synchronization analysis and send separate instructions to each energy source.

With this technique, since each energy source contains the intelligence to perform its own synchronization, additional energy sources can be added to an existing electrical distribution system 40 without having to modify the previously installed equipment and control apparatus. Such an additional energy source merely has to be connected to the parallel electrical bus 42 and to the two communication links 34 and 36. If a load manager 64 is not present, an additional connection may have to be made to the control line 46 from the automatic transfer switch 45 to receive the start command.

Although the operation of the synchronization routine 70 has been described in the context of engine-generators sets (gensets) 51-53, a similar routine is executed by a controller within the other types of energy sources. The other energy sources have mechanisms for synchronizing their electrical output to the electricity already present on the parallel electrical bus 42. For example, wind turbine generators and photovoltaic arrays typically have inverters that convert internal DC voltage to an alternating output voltage. The inverter can be controlled to shift the phase of the output voltage to synchronize that alternating voltage waveform with the alternating voltage on present on utility lines.

In addition to providing the synchronization, the present invention also enables the controller in each energy source 47-49 to perform load sharing which equitably distributes power demands of the loads the among the energy sources without requiring an additional centralized controller. That is achieved by operating all the energy sources at approximately the same proportion of their maximum power capacity. Even if the energy sources 47-49 do not have the same power generating capacity (i.e. identical maximum power rating), operating each one at the same proportion of its maximum power capacity equitably shares the power requirements of the loads among all the operating energy sources.

Figure 4:
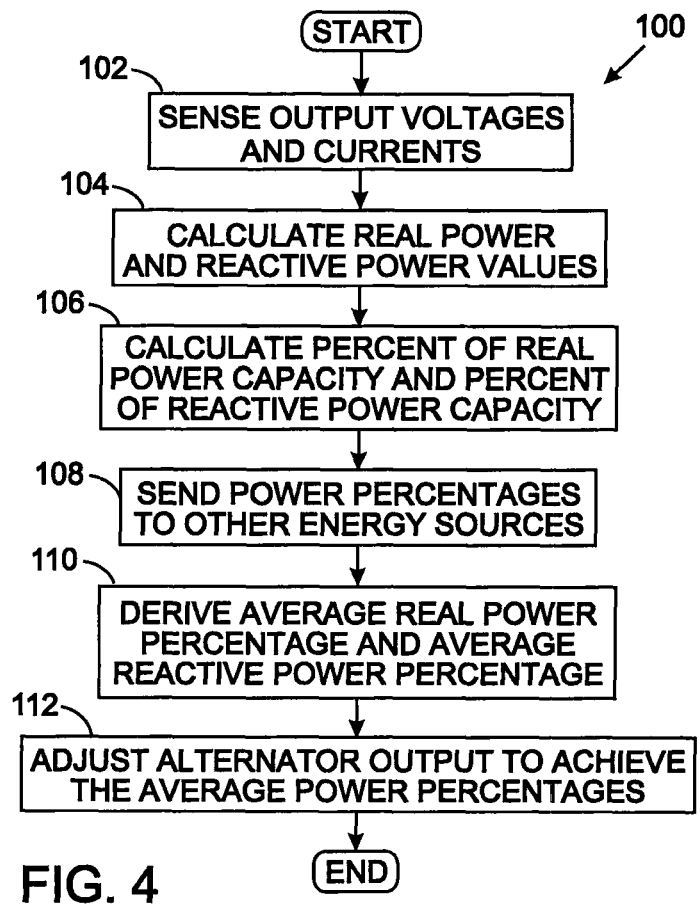
FIG. 4 is a flowchart of a load sharing function performed by each energy source.

For this load sharing function 100, each genset controller 22 periodically determines the magnitude of both the real and reactive power being supplied at its outputs 19. Each generator 51-53 executes a load sharing function 100 depicted by the flowchart in FIG. 4. At step 102, the respective genset controller 22 reads the output voltage and current levels from the associated output sensors 26 and at step 104 uses conventional techniques to derive values indicating the real power and the reactive power being produced. The real power value is compared to a maximum real power rating for the generator at step 106 to determine the percentage of the maximum real power rating that is being produced, thus yielding a real power percentage. Similarly the measured reactive power value is compared to a maximum reactive power rating for the generator to determine the percentage of the maximum reactive power rating that is being produced, thus yielding a reactive power percentage.

Then, the genset controller 22 sends its real power percentage and reactive power percentage to the other energy sources 47-49 via the first communication link 34 at step 108. Therefore, every energy source knows the level at which all the energy sources are operating.

Each genset controller 22 compares its real power percentage and reactive power percentage to those of the other energy sources to determine whether the respective energy source is producing more or less than its equitable share of the overall power demand. For example, a given genset controller 22 at step 110 computes the average real power percentage for all the active energy sources 47-49 and computes the average reactive power percentage for all the energy sources. Thereafter at step 112, the genset controller 22 alters operation of the respective alternator 16 to produce that average percentage of its maximum real power rating. For an energy source that is an engine-generator set, the real power is controlled by varying the fuel flow to the engine 12. Thus the engine throttle is varied until the alternator produces the desired amount of real power. Operation of the respective alternator 16 also is adjusted to produce the average percentage of its maximum reactive power rating. The reactive power is controlled by varying the excitation of the field winding in the alternator 16. The load sharing function 100 is performed periodically by each energy source 47-49, thereby accommodating dynamic changes in the electrical distribution system 40. In this manner, all the energy sources tend to operate at the same proportion of their maximum power capacity without requiring a separate central controller that governs the load sharing.

The electrical distribution system 40 also performs other load management techniques. For example, at certain time of the day the electrical loads are reduced to a level that can be satisfied efficiently by less than all of the available energy sources. In one instance where the electrical distribution system is on a yacht, very few electrical devices are active at night when the yacht is moored in a harbor. The entire electrical load may comprise a relatively small number of lights, that may even be powered by a single-phase of electric current. In contrast, the moored yacht during the daytime has many active electrical loads, such as cooking equipment in the galley, entertainment systems, and a larger number of interior lights. Therefore, at a predefined time during the night, the load manager 64 for the yacht automatically opens the contactors 62 for predetermined electrical loads that normally are inactive at that time. The contactors remaining closed are connected to the B and C lines of the parallel electrical bus 42.

Then the load manager 64 transmits a start command over the second communication link 36 to the third generator (genset) 53. The third generator 53 is a single-phase source which normally is in a dormant state when one of both of the three-phase first and second generators 51 and 52 is active. After the third generator 53 begins producing an acceptable output level that is synchronized to the electricity already present on the parallel electrical bus 42, the third circuit breaker 58 is closed to apply the third generator's output to that bus. This event is signalled to the load manager 64 via the second communication link 36 which reacts by sending a shut-down command over that link to the first and second generators 51 and 52. Those energy sources respond by opening the respective circuit breakers 56 and 57 and terminating operation, thereby leaving only the single-phase third generator 53 active to supply the necessary power. Therefore, only the smaller third generator 53 is active which reduces diminishes engine fuel consumption and minimizes machinery noise during the night.

At a prescribed time the next morning, the load manager 64 issues commands that restart the dormant three-phase, first and second energy sources 47 and 48. Once those energy sources are up to speed and their outputs are synchronized to the electricity present on the parallel electrical bus 42, the associated circuit breaker 56 or 57 closes. After the first and second energy sources 47 and 48 are applying current to the parallel electrical bus 42, the third energy source 49 is disconnected from that bus and shut down. Then the load manager 64 closes the contactors for all the loads so that the yacht is fully powered for another day.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A generator arrangement for supplying electricity to a parallel electrical bus to which at least one other energy source is able to supply electricity, said generator arrangement comprising:
    an alternator that produces alternating electricity;
    a circuit breaker selectively connecting and disconnecting the alternator to and from the parallel electrical bus;
    an output sensor for sensing at least one of voltage and current of the alternating electricity;
    a bus sensor for sensing at least one of voltage and current of electricity in the parallel electrical bus;
    a genset controller connected to the output sensor, the bus sensor and the circuit breaker, and operatively connected to control excitation and speed of the alternator; prior to applying the alternating electricity to the parallel electrical bus, the genset controller:
        a) determines whether electricity is present on the parallel electrical bus,
        b) if electricity is not present on the parallel electrical bus, the genset controller operates the circuit breaker to apply the alternating electricity produced by the alternator to the parallel electrical bus,
        c) if electricity is present on the parallel electrical bus, then the genset controller:
            1) varies operation of the alternator to synchronize the alternating electricity produced by the alternator to the electricity present on the parallel electrical bus, and thereafter
            2) operates the circuit breaker to apply the alternating electricity produced by the alternator to the parallel electrical bus; and
    a communication interface for exchanging messages with all other energy sources;
    wherein the genset controller sends a message via the communication interface to inform other energy sources that the alternating electricity produced by the alternator is about to be applied to the parallel electrical bus; and
    wherein the alternating electricity produced by the alternator is applied to the parallel electrical bus only if the genset controller receives a response message from at least one other energy source.

2. The generator arrangement as recited in claim 1 further comprising an internal combustion engine driving the alternator;
wherein the genset controller varies operation of the alternator by altering speed of the internal combustion engine.

3. The generator arrangement as recited in claim 1, wherein the genset controller varies operation of the alternator by altering speed of the alternator.

4. The generator arrangement as recited in claim 1, wherein the alternator comprises a field winding that produces a magnetic field;
wherein the genset controller varying operation of the alternator comprises altering the magnetic field.

5. The generator arrangement as recited in claim 1, wherein the genset controller further implements a load sharing function by:
determining a given operating level of the alternator;
detecting an operating level of each of the other energy sources; and
adjusting operation of the alternator so that the given operating level is substantially identical to the operating levels of the other energy sources.

6. The generator arrangement as recited in claim 1, wherein the genset controller further implements a load sharing function by:
determining a given percentage of a maximum power capacity at which the alternator is operating;
detecting a percentage of a respective maximum power capacity at which each other energy source is operating, thereby producing a percentage set;
calculating an average percentage from the given percentage and the percentage set; and
adjusting operation of the alternator so that the given percentage substantially equals the average percentage.

7. The generator arrangement as recited in claim 6 wherein implementation of the load sharing function by the genset controller further comprises sending an indication of the given percentage to other energy sources.

8. A system for supplying electricity to a parallel electrical bus, said system comprising:
a first generator arrangement having a first alternator that produces alternating electricity at an output, a first circuit breaker selectively connecting and disconnecting the output of the first alternator to and from the parallel electrical bus, a first output sensor for sensing a characteristic of the alternating electricity produced by the first alternator, a first bus sensor for sensing the characteristic of electricity in the parallel electrical bus, and a first genset controller connected to the first output sensor, the first bus sensor and the first circuit breaker, and operatively connected to control excitation and speed of the first alternator; and
a second generator arrangement having a second alternator that produces alternating electricity at an output, a second circuit breaker selectively connecting and disconnecting the output of the second alternator to and from the parallel electrical bus, a second output sensor for sensing a parameter of the alternating electricity produced by the second alternator, a second bus sensor for sensing the parameter of electricity in the parallel electrical bus, and a second genset controller connected to the second output sensor, the second bus sensor and the second circuit breaker, and operatively connected to control excitation and speed of the second alternator;

wherein each of the first and second genset controller:
a) determines whether electricity is present on the parallel electrical bus;
b) if electricity is not present on the parallel electrical bus, operates a respective one of the first and second circuit breaker to apply the alternating electricity to the parallel electrical bus;
c) if electricity is present on the parallel electrical bus, then the first or second genset controller:
1) varies operation of a respective one of the first and second alternator to synchronize the alternating electricity produced by that alternator to the electricity present on the parallel electrical bus; and thereafter
2) operates a respective one of the first and second circuit breaker to apply the alternating electricity to the parallel electrical bus; and
d) implements a load sharing function by:
determining a given operating level of the respective alternator;
detecting an operating level of each of the other energy sources; and
adjusting an operation of the respective alternator so that the given operating level is substantially identical to the operating levels of the other energy sources.

9. The system as recited in claim 8, wherein the first generator produces three-phase electricity and the second generator produces single-phase electricity.

10. The system as recited in claim 8, wherein the first generator is an engine-generator set.

11. The system as recited in claim 8, wherein the second generator is selected from the group consisting of a photovoltaic array, a wind turbine generator, a geothermal powered electrical generator, and a heat pump.

12. A method for operating a generator arrangement to furnish alternating electricity to a parallel electrical bus to which one or more other energy sources also supply electricity, wherein the generator arrangement has an alternator that produces the alternating and a genset controller that regulates a voltage and a frequency of the alternating electricity, said method comprising:
the genset controller performing steps of:
a) sensing whether electricity is present on the parallel electrical bus;
b) if electricity is not present on the parallel electrical bus, operating a circuit breaker to apply the alternating electricity produced by the alternator to the parallel electrical bus;
c) if electricity is present on the parallel electrical bus:
1) synchronizing the alternating electricity produced by the alternator to the electricity on the parallel electrical bus; and thereafter
2) operating the circuit breaker to apply the alternating electricity to the parallel electrical bus;
determining a first percentage of a given maximum power capacity at which the alternator is operating;
for each other energy source, detecting a percentage of respective maximum power capacities at which each other energy source is operating, thereby producing a percentage set;
calculating an average percentage from the first percentage and the percentage set; and
adjusting operation of the first generator until the alternator is operating at the average percentage of the given maximum power capacity.

13. The method as recited in claim 12 further comprising, when the genset controller determines that electricity is not present on the parallel electrical bus, sending a message to the other energy sources; and
operating a circuit breaker to apply the alternating electricity to the parallel electrical bus only upon receipt of a reply message from all the other energy sources.

14. The method as recited in claim 12 wherein synchronizing the electricity comprises:
sensing a given occurrence of a characteristic of the alternating electricity produced by the generator;
sensing a particular occurrence of the characteristic of the electricity on the parallel electrical bus;
determining a difference in time between the given occurrence and the particular occurrence; and
altering operation of the first generator so that the difference in time is no greater than a predefined amount.

15. The method as recited in claim 14 wherein altering operation of the first generator comprises varying a speed of the first generator.

16. The method as recited in claim 12 further comprising sending an indication of the first percentage to the other energy sources.

17. The method as recited in claim 12 wherein detecting a percentage for each other energy source comprises receiving value from each other energy source.

18. A method for operating a generator arrangement to furnish alternating electricity to a parallel electrical bus to which one or more other energy sources are able to supply electricity, wherein the generator arrangement has an alternator that produces the alternating electricity and a genset controller that regulates voltage and frequency of the alternating electricity, said method comprising:
measuring a first level of power produced by the alternator;
for each other energy source, detecting a level of power being produced;
adjusting operation of the alternator so that the alternator and the other energy sources produce substantially identical levels of power;
measuring a first level of power comprises determining a first percentage of a maximum power capacity at which the alternator is operating;
for each other energy source, detecting a percentage of a respective maximum power capacity at which that other energy source is operating, thereby producing a percentage set, where the detecting comprises receiving an indication of that percentage from another energy source; and
adjusting operation of the alternator comprises calculating an average percentage from the first percentage and the percentage set, and adjusting the alternator so that the first percentage substantially equals the average percentage.

19. The method as recited in claim 18 further comprising sending an indication of the first percentage to each other energy source.

* * * * *